UNITED STATES PATENT OFFICE.

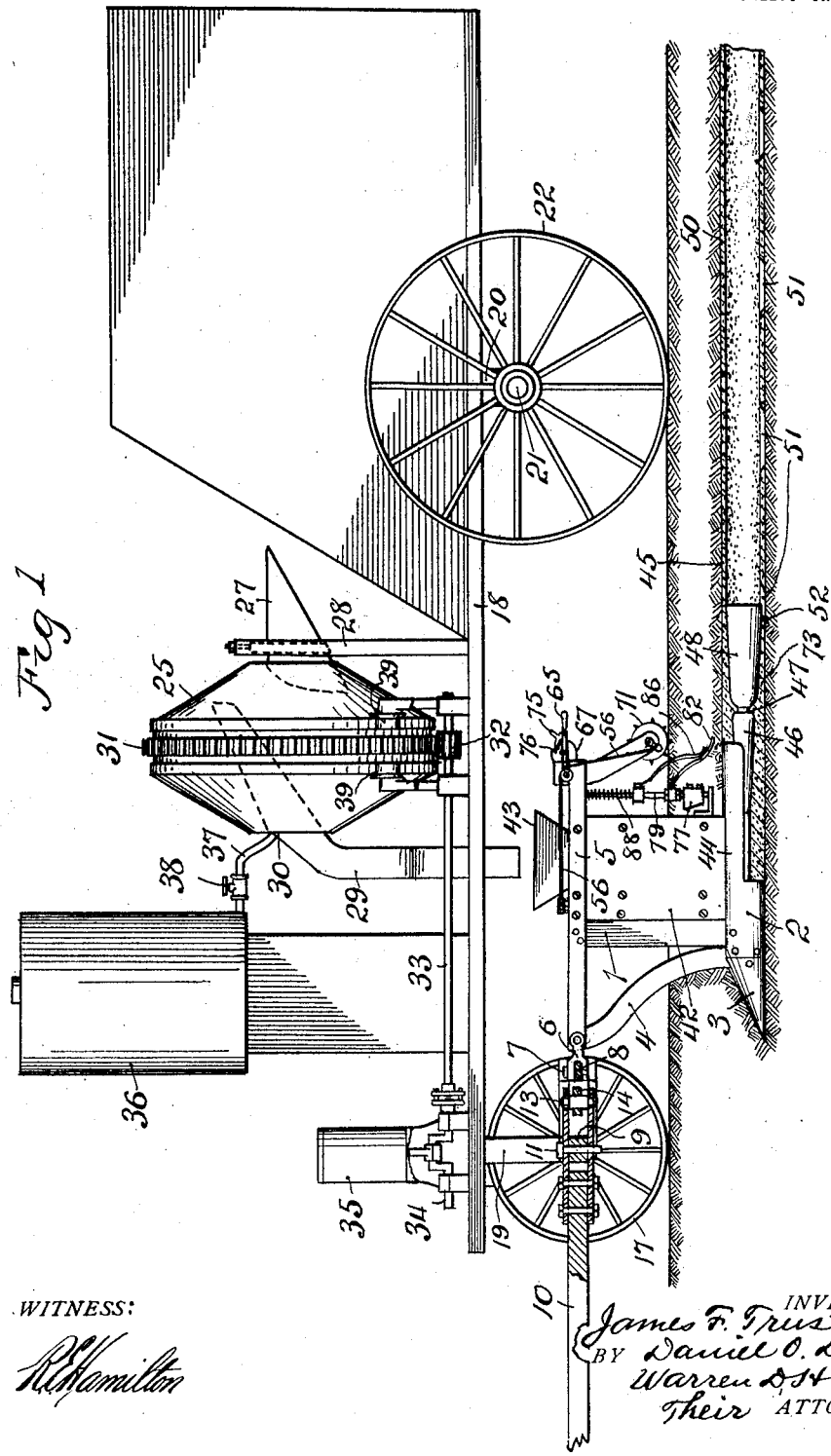

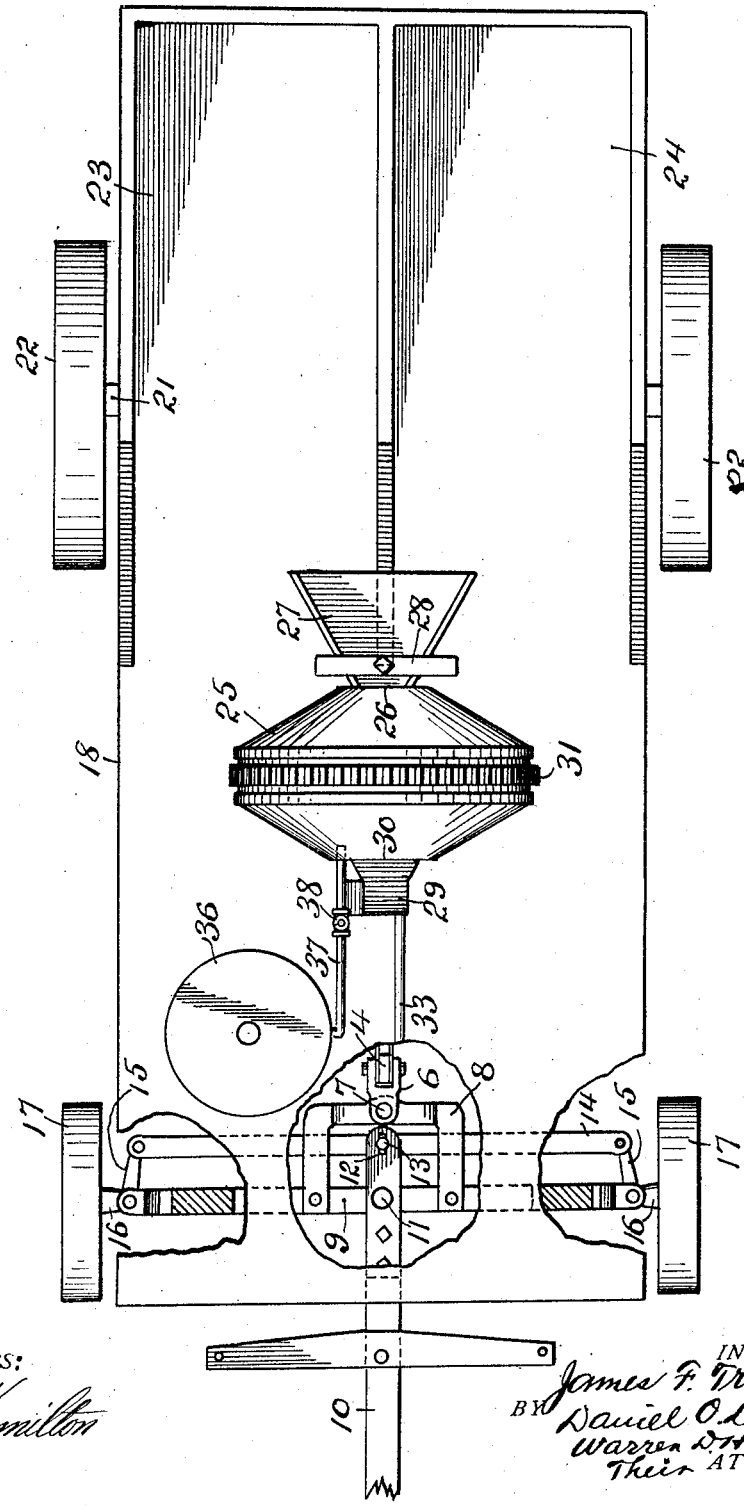

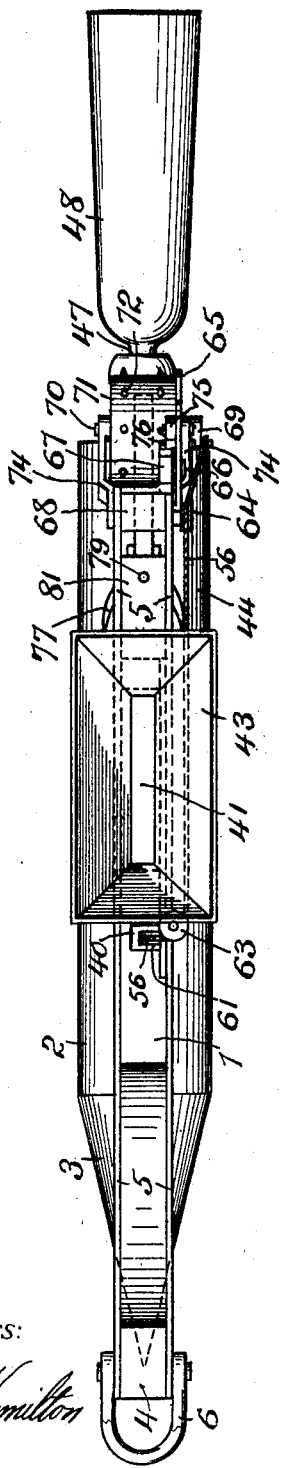

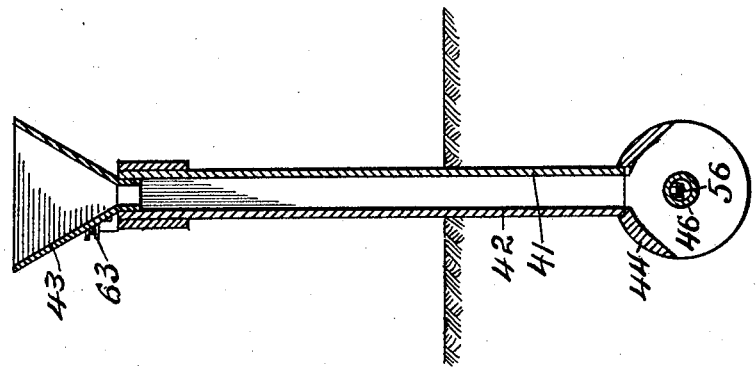
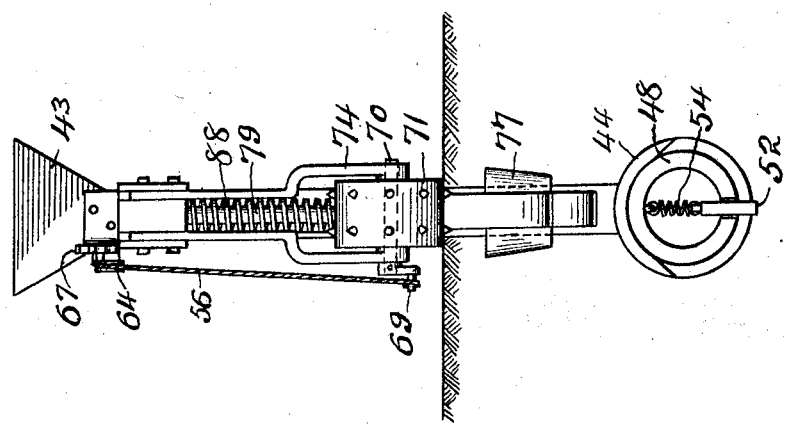

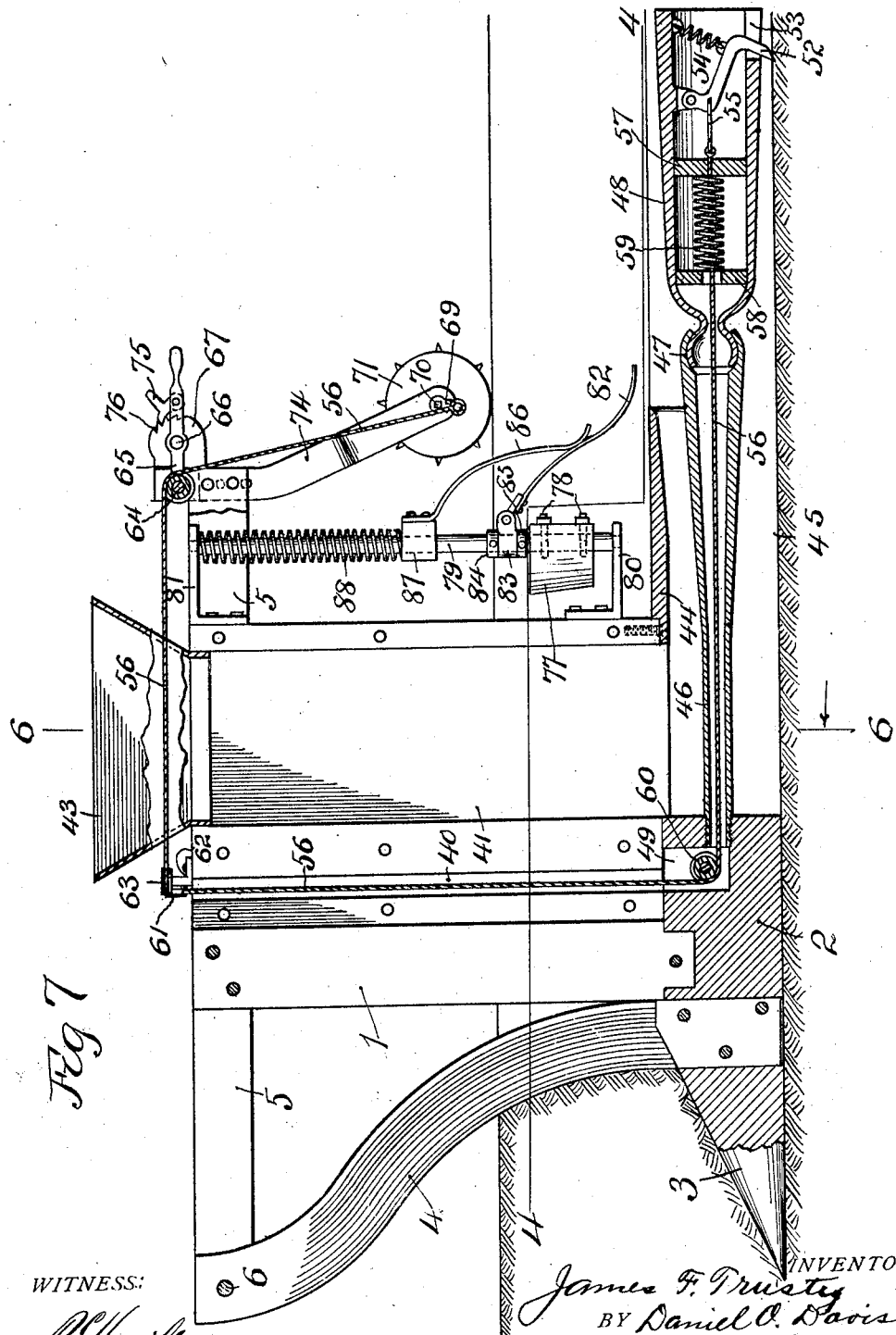

JAMES F. TRUSTY AND DANIEL O. DAVISON, OF KANSAS CITY, MISSOURI; SAID DAVISON ASSIGNOR TO SAID TRUSTY.

MACHINE FOR MAKING AND LAYING PIPE.

1,398,815. Specification of Letters Patent. Patented Nov. 29, 1921.

Application filed May 24, 1918. Serial No. 236,442.

*To all whom it may concern:*

Be it known that we, JAMES F. TRUSTY and DANIEL O. DAVISON, citizens of the United States, residing at Kansas City, in the county of Jackson and State of Missouri, have invented a certain new and useful Improvement in a Machine for Making and Laying Pipe, of which the following is a specification.

Our invention relates to improvements in machines for making and laying pipe.

The object of our invention is to provide a machine of novel construction adapted for forming an underground conduit and at the same time forming and laying in said conduit pipe composed of concrete or other suitable material.

A further object of our invention is to provide novel means for mixing and feeding the pipe forming material into the conduit made by the machine.

Still another object of our invention is the provision of a conduit plow having a novel guard or shield which supports the roof of the conduit, but which permits the pipe material to be discharged vertically upon the bottom of the conduit below the shield.

Still another object of our invention is the provision of a novel flexible core, which will permit the machine to easily make turns.

Another object of our invention is the provision of a conduit forming plow which may be easily drawn and which will hold to the required depth in the ground.

Our invention provides further novel mechanism for perforating the pipe.

Our invention provides still further novel means for filling the ditch and pressing the dirt downwardly in the ditch.

Other novel features of our invention are hereinafter fully described and claimed.

In the accompanying drawings which illustrate the preferred embodiment of our invention, Figure 1 is a view partly in side elevation and partly in vertical section, and partly broken away of our improved pipe making and laying machine.

Fig. 2 is a top view of the same with parts broken away.

Fig. 3 is an enlarged plan view of the plow and pipe forming mechanism, the plow being detached from the wagon.

Fig. 4 is a horizontal sectional view on the line 4—4 of Fig. 7.

Fig. 5 is a rear end elevation of the plow and parts connected therewith.

Fig. 6 is a vertical sectional view on the line 6—6 of Fig. 7.

Fig. 7 is a view of the plow and pipe forming mechanism shown partly in side elevation, partly in vertical section and partly broken away.

Similar reference characters designate similar parts in the different views.

Our conduit forming plow consists preferably of a transversely narrow vertical portion 1 to the lower end of which is secured, preferably detachably, a longitudinal conduit forming body 2, preferably cylindrical, and which at its forward end is provided with a conical point 3, the axis of which inclines upwardly and rearwardly, and the lower side of which is horizontal and the upper side upwardly and rearwardly inclined.

The plow is provided with a cutting blade 4, the forward edge of which is sharpened, and which curves upwardly and forwardly from the body 2, the upper end of the blade 4 being secured between two horizontal forwardly extending plates 5 which are secured to opposite sides of and extend rearwardly from the upright portion 1.

The plow is drawn by means of a clevis 6 which is attached to the blade 4 and plates 5. Preferably a portable structure, which also carries the pipe making material is employed to draw the plow in making the conduit and laying the pipe.

In the drawing, we have shown as a means for drawing the plow, a wheeled vehicle, shown in Figs. 1 and 2. Referring to these two figures, it will be seen that the clevis 6 is pivoted by a vertical bolt 7 to a U-shaped member 8, the arms of which are rigidly secured to the front axle 9 at opposite sides of a tongue 10, which is pivoted by a king-bolt 11 to the axle 9 and the rear end of which is provided with a longitudinal slot, 12, through which extends a pin 13, which is secured to a transverse connecting bar 14, the ends of which are respectively pivoted to the cranks 15, Fig. 2, of the two spindles 16 on which are respectively revolubly mounted the front wheels 17 of the wagon.

18 designates a platform which is supported by two bolsters 19 and 20 respectively mounted upon the front axle 9 and the rear axle 21. The rear axle has mounted on it the usual rear carrying wheels 22.

On the platform 18, at the rear end thereof, are provided two bins 23 and 24, Fig. 2, adapted to contain sand and cement.

Suitable means are provided on the platform 18 for mixing the sand and cement.

In the drawing, there is shown revolubly mounted on the platform 18 an ordinary mixing vessel 25 having a rear axial opening 26, into which the sand and cement are discharged after being shoveled upon the inclined funnel 27, which is supported between the arms of an inverted U-shaped standard 28, the lower end of which is secured to the platform 18.

The mixer is provided with usual discharge conductor 29, the upper end of which extends upwardly and rearwardly into the rotary vessel 25 through an axial opening 30 in the forward side thereof.

The periphery of the vessel 25 is provided with the usual gear teeth 31 which mesh with a pinion 32, Fig. 1, which is secured to and rotatable with a horizontal longitudinal shaft 33, which is secured to and driven by the crank shaft 34 of an ordinary explosive engine 35, mounted on the platform 18.

An elevated water tank 36 mounted on the platform 18 has connected to it a discharge conductor 37 which discharges into the vessel 25 through the opening 30 and which is provided with a shut-off valve 38.

The vessel 25 is revolubly supported upon the usual rollers 39, two of which are shown. This type of mixer is well known so that its mode of operation and construction is well understood by those familiar with the art.

The upright portion 1 of the plow is provided with two vertical passages 40 and 41, access to the sides of which may be obtained by detaching a removable cover plate 42, shown in Figs. 1 and 4.

In the upper end of the passage 41 is mounted a funnel 43, which is disposed directly below the discharge end of the conductor 29.

Extending rearwardly from the body 2 of the plow is a curved shield 44, which is above and spaced apart from the conduit 45, which is formed in the ground by the plow body 2. The shield 44 is provided with a central opening which communicates with the passage 41, and which permits the pipe forming material to be discharged downwardly upon the bottom of the conduit 45 and under the shield 44 and at the rear of the body 2. The upper side of the shield 44 bears against and supports the roof of the conduit.

Extending rearwardly in the conduit 45 from the body 2 is a core, preferably flexible, and which is preferably composed of a horizontal tubular longitudinal front member 46, the rear end of which is connected by a universal joint, preferably a ball and socket joint 47 with the forward end of a rear core member 48, the walls of which diverge rearwardly, and the largest or rear end of the member 48 being smaller in diameter than the diameter of the conduit 45.

The forward end of the core member 46 is screw-threaded and fitted into a screw-threaded hole in the rear end of body 2, which hole communicates with a recess 49 in the upper side of the body 2, which recess communicates with the passage 40.

By unscrewing the core member 46, it may be detached from the body 2 for the purpose of being cleaned.

When the vehicle is drawn forwardly, the point 3 and body 2 of the plow will make the conduit 45 in the ground, the blade 4 forming a ditch above the conduit for the passage of the vertical portion 1. If the engine 35 is now operated, the mixing vessel 25 will be revolved, and sand and cement fed into the vessel 25 will be mixed with water and together, and the mixture will be discharged through the conductor 29 into the funnel 43 and thence through the passage 41 and shield 44 into the conduit 45 below the shield 44. The mixture will be of the usual consistency of sand and cement employed for similar purposes, and as the plow moves forwardly, the conduit 45 will be filled by the cement and sand mixture, which will be forced outwardly tightly against the walls of the conduit by the rear core member 28, so as to form the pipe 50, Fig. 1. After passing the core 48, the mixture will have sufficient stability to be self supporting in its pipe form.

For the purpose of making a series of perforations 51 in the bottom of the pipe 50, there is pivoted in the core member 48, which is tubular, a perforator comprising a tooth 52 which is adapted to swing through a slot 53 in the lower side of the member 48. A coil spring 54 attached to the tooth 52 and the member 48 normally retracts the tooth into the member 48. For automatically forcing the tooth 52 through the slot 53 and through the pipe 50 at regular intervals, so as to form the perforations 51, the tooth 52 has attached to it a hook 55 which is attached to a cord or other flexible member 56, which extends through a disk 57 slidable in the member 48 and through a plate 58 fixed in the member 48. A coil spring 59 which has one end bearing against the plate 58 and the other end bearing against the disk 57, assists the spring 54 in retracting the cord 56, so as to withdraw the tooth 52 out of the cement.

For periodically drawing the tooth 52 forwardly so as to have it extend through the cement to form the slots 51, the cord 56 extends through the members 48 and 46 into the recess 49, in which it passes around a pulley 60, passing from thence upwardly through the passage 40 to and over a pulley 61, which is mounted on a bracket 62, which is supported upon the upper end of the portion 1, see Figs. 3 and 7, thence horizontally laterally to a pulley 63, which is mounted on the bracket 62, thence rearwardly to a pulley 64, which is pivotally mounted on the forward end of a lever 65, which is pivoted by a horizontal pin 66 to the rearwardly extending arm of a right-angled plate 67, the other arm of which is secured to a block 68, which is secured to and between the plates 5.

The cord 56 extends downwardly from the pulley 64 and is attached to a crank 69, which is secured to a horizontal transverse shaft 70, to which is rigidly secured a wheel 71, preferably provided with peripheral teeth 72, and which upon being revolved, by pressing on the surface of the ground, draws downwardly on the cord 56, during every revolution of the wheel 71, thereby pulling forwardly the tooth 52 against the pressure of the springs 54 and 59, so that the tooth is forced through the cement mixer 73, Fig. 1, thereby forming in the pipe 50 the drain slots 51. By having the drain slots 51 formed in the bottom of the pipe 50, the latter is efficiently drained.

The wheel shaft 70 is rotatably mounted in the lower ends of two upwardly and forwardly extending plates 74, the upper ends of which are rigidly fastened to the plates 5 respectively.

By swinging downwardly the rear end of the hand operated lever 65, the cord 6 and tooth 52 may be forced into operative position. For holding the lever 65 and cord 56 in the operative position, the lever 65 has pivoted to it a pawl 75, which is adapted to engage with any one of a series of ratchet teeth, which are provided on the rear arcuate edge of the plate 67, see Figs. 1 and 7.

By releasing the pawl 75 from the teeth 76, the forward end of the lever 65 may be swung downwardly, so as to so slacken the cord 56 that it will not draw the tooth 52 into operative position, when the wheel 71 revolves.

For filling the ditch formed by the blade 4 above the conduit 45, and for tightly pressing the earth in said ditch above said conduit, we provide a scraper 77, Figs. 4 and 7, which is provided with two forwardly and outwardly extending arms, which have a spread greater than the width of the blade 4 and upright portion 1. The scraper 77 is secured by means of two U-bolts 78 to a vertical bar 79, the lower and upper ends of which are respectively mounted in the horizontal portions of two right-angled plates 80 and 81, which are secured to the rear side of the upright portion 1. The scraper 77 is located below the surface of the ground, so that its arms scrape earth from the sides of the ditch into the ditch at the rear of the upright portion 1.

The dirt so scraped is pressed downwardly by means of a spring presser plate 82, Figs. 1 and 7, the upper end of which is pivoted to a collar 83, which is mounted upon the upright bar 79, between two collars 84 and 85 which are secured to said bar.

Bearing upon the upper side of the spring plate 82 is a spring plate 86, which is secured to a collar 87, vertically slidable upon the bar 79 and which is normally forced downwardly by means of a coil spring 88, which encircles the bar 79 and has its upper end bearing against the plate 81. The coil spring 88 and the flat spring 86 yieldingly force the presser plate 82 downwardly so as to press down the earth which is scraped into the ditch by the scraper 77.

In the operation of our invention, water having been placed in the tank 36, and sand and cement in the bins 23 and 24, the engine 35 is operated, and the vehicle is drawn forwardly at the place where it is designed to make and lay the pipe.

As the plow is drawn forwardly by the vehicle, the point 3 and body 2 thereof form the conduit 45, and the blade 4 forms the ditch above the conduit for the passage of the upright portion 1 of the plow. A shoveler or shovelers standing on the platform 18 now shovel into the funnel 27, or otherwise discharge into the funnel, suitable proportions of sand and cement, which ingredients are mixed by the revolving mixer vessel 25, a suitable amount of water being admitted into the vessel from the tank 36 by opening the valve 38. The mixed sand, cement and water is then discharged in the usual manner by the revolving mixer vessel 25 into the conductor 29, which discharges the mixture into the funnel or hopper 43, through which the material passes into the passage 41, from which it is discharged directly downwardly under the shield 44, around the core member 46, and upon the bottom of the conduit 45 directly below the shield 44. The shield 44 supports the roof of the conduit 45, but does not interfere with the depositing of the cement mixture by gravity upon the bottom of the conduit. To prevent any liability of the shield 45 obstructing in any manner the feed downwardly of the cement mixture into the conduit, the shield is semi-circular in form, as shown in Figs. 5 and 6, and, preferably does not extend below the middle of the conduit. The cement mixture is, therefore, permitted to flow directly downwardly by its gravity, so as to fill the conduit around the core member 46. By having the cement mixture flow directly downwardly upon the bottom of the conduit, no forced feed is required to prevent clogging of the material, such as would be liable to occur if the material were discharged rearwardly into the conduit. The core member 46 preferably enlarges rearwardly in diameter, so that as the plow travels along, the cement mixture is forced outwardly into tubular form, and is finally tightly pressed against the walls of the conduit by the core member 48, the rear large end of which determines the inner diameter of the pipe 50 which is formed within the conduit at the rear of the core member 48, as shown in Fig. 1.

At this time, the pipe material has attained sufficient stability to be self-supporting.

If it is desired to provide in the pipe 50 the perforations 51, the operator forces downwardly the rear end of the lever 65, thereby placing into active operation the cord 56 and the tooth 52, in the manner already described.

As the machine travels forwardly, the scrapers 77 scrape dirt into the ditch, and the earth so scraped is pressed downwardly by the presser plate 82 actuated by the spring plate 86 and the spring 88. The yielding character of the last named members permits the presser plate 82 to swing upwardly in case that a rock or other unyielding obstacle is encountered.

The wheel 71 in traveling along at the rear of the plate 86 presses dirt into the ditch, as well as effecting the function of forcing the tooth 52 into its operative position.

The flexible draft connection of the plow with the vehicle, and the form and disposition of the plow point 3, together with the upwardly and forwardly curved cutting blade 4, enables the plow in being drawn forwardly to reach and retain its proper position at the proper depth in the ground.

The manner of connecting the tongue with the front axle and with the pivoted spindles of the front wheels permits the vehicle to be easily turned, while the universal joint connection between the core members 46 and 48 permits the rear end of the core member 48 to remain concentric with the walls of the conduit, when the machine is making a turn, thus enabling the pipe 50 to be laid in a curve while retaining an even thickness throughout.

The parts 1, 2, 3, 4, 5 and 42 are, preferably, detachably secured together, so that, if desired, these parts may be disassembled for the purpose of repair or replacement.

We do not limit out invention to the structure shown and described, as modifications, within the scope of the appended claim, may be made without departing from the spirit of our invention.

What we claim is:—

In a machine for making and laying pipe, a conduit forming plow, a core extending rearwardly therefrom, a movable pipe perforator carried by said core, a rotary member carried by the plow and provided with a crank and arranged to contact with the ground and to be rotated thereby, as the plow moves forwardly, a flexible device connecting said crank and said perforator and arranged to draw the perforator into operative position during each revolution of said rotary member, and a spring for retracting the perforator from the operative position, substantially as set forth.

In testimony whereof we have signed our names to this specification.

JAMES F. TRUSTY.
DANIEL O. DAVISON.